United States Patent [19]
Shigehara

[11] Patent Number: 6,141,466
[45] Date of Patent: Oct. 31, 2000

[54] WAVELENGTH-VARIABLE LIGHT SOURCE AND OTDR APPARATUS

[75] Inventor: Masakazu Shigehara, Yokohama, Japan

[73] Assignee: Sumitomo Electric Industries, Ltd., Osaka, Japan

[21] Appl. No.: 09/014,272

[22] Filed: Jan. 27, 1998

[30] Foreign Application Priority Data

Jan. 27, 1997 [JP] Japan .................................. 9-012775
Jan. 6, 1998 [JP] Japan ................................. 10-000809

[51] Int. Cl.$^7$ ...................................................... G02B 6/26
[52] U.S. Cl. ................................................ 385/22; 372/43
[58] Field of Search ................................. 385/37–40, 11, 385/14, 24, 27; 372/45, 46, 50, 96, 43

[56] References Cited

FOREIGN PATENT DOCUMENTS 2-141641A  5/1990  Japan .

*Primary Examiner*—Akm E. Ullah
*Attorney, Agent, or Firm*—Pillsbury Madison & Sutro, LLP

[57] ABSTRACT

The wavelength-variable light source comprises a semiconductor light-emitting device 11; a first light waveguide 31 optically coupled to the semiconductor light-emitting device; a plurality of second light waveguides 32, disposed in parallel to each other, in which light-waveguide-type diffraction gratings 21 having wavelengths different from each other are respectively disposed; a first optical switch 12 formed such that the first light waveguide can oppose the second light waveguides; and a condenser 13 which collects output optical powers from a plurality of second light waveguides into one beam. The semiconductor light-emitting device 11, first light waveguide 31, second light waveguides 32, and light-waveguide-type diffraction gratings 21 form a resonator 40, which oscillates light having a wavelength reflected by the light-waveguide-type diffraction gratings 21.

14 Claims, 12 Drawing Sheets

WAVELENGTH-VARIABLE LIGHT SOURCE AND OTDR APPARATUS

BACKGROUND OF THE INVENTION

1. Field of the Invention

The present invention relates to a light source discretely oscillating a desired wavelength and, in particular, to a wavelength-variable light source loaded in an apparatus for measuring a loss distribution of a branch optical line whose one end is divided into a plurality of light-branching lines, and an OTDR apparatus.

2. Related Background Art

A conventional OTDR apparatus is disclosed in Japanese Patent Application Laid-Open No. 2-141641, which indicates that a wavelength-variable light source is efficient for inspecting a defect or a physical quantity such as temperature within a system to be measured having a branch device.

SUMMARY OF THE INVENTION

Conventional wavelength-variable light sources added to an OTDR apparatus include the one using a method in which a reflecting plate of diffraction gratings is disposed outside a light-emitting device, with its angle being adjusted so as to change wavelength of oscillation; a fiber type laser using a wavelength-variable filter; and the like. These light sources necessitate a large number of constituent parts, each of which is expensive, a high level of assembling technique, and the like.

Therefore, it is an object of the present invention to provide a wavelength-variable light source and an OTDR apparatus, which are inexpensive and have a simple configuration.

A wavelength-variable light source in accordance with the present invention comprises: a semiconductor light-emitting device; a first light waveguide optically coupled to said semiconductor light-emitting device; a plurality of second light waveguides each of which having a diffraction grating with different reflection wavelengths formed therein; and a first optical switch which selectively optically couples an output end of said first light waveguide to one of input ends of said second light waveguides.

A preferable first wavelength-variable light source in accordance with the present invention is characterized in that it comprises a semiconductor light-emitting device which can emit light having a plurality of predetermined wavelengths; a first light waveguide optically coupled to the semiconductor light-emitting device; a plurality of second light waveguides in which light-waveguide-type diffraction gratings having different reflection wavelengths are formed; a first optical switch for selectively optically coupling an output end of the first light waveguide to an input end of a plurality of the second light waveguides; and a condenser for optically coupling a plurality of output ends of a plurality of the second light waveguides to an input end of a light waveguide in a next stage.

In accordance with the wavelength-variable light source of the present invention, a resonator is formed by the semiconductor light-emitting device, light-waveguide-type diffraction grating. Thus, light having a wavelength reflected by the light-waveguide-type diffraction grating is repeatedly reflected within the resonator in a reciprocating fashion, whereby pulse light of a predetermined amplitude is outputted from the diffraction grating of the second light waveguide. Accordingly, a plurality of light-waveguide-type diffraction gratings having different reflection wavelength regions are disposed in parallel, input light thereto is switched by the first optical switch, so that output light beams with different wavelengths are successively sent out, and the output light is coupled to the light waveguide of the next stage by means of the condenser, whereby light having a desired wavelength can be oscillated at a low cost.

The fading noise noticeable upon measurement of a loss distribution in an optical fiber tends to occur when the wavelength band of the pulse light to be measured becomes 1 nm or less. To suppress the fading noise, it is preferred that the reflection wavelength band of the light-waveguide-type diffraction grating be set to at least 1 nm by chirped grating.

In the wavelength-variable light source of the present invention, there may be a case where a predetermined wavelength band of light cannot be oscillated by a single semiconductor light-emitting device. In such a case, a plurality of semiconductor light-emitting devices having different wavelength regions may be disposed in parallel so that they bear respective parts of the wavelength region.

It has experimentally been confirmed that, in the case where the optical length between the semiconductor light-emitting device and the diffraction grating is 700 mm or less, the resonator applied to the present invention can oscillate a pulse having a peak value of 10 dB or higher in a wavelength band of 5 nm when the wavelength intervals are set to 5 nm, thereby allowing eight wavelength regions of pulse light to be sent out. A wavelength-variable light source equipped with such a resonator can measure a loss distribution in an optical line having eight branches, thus being fully capable of practical use.

Also, it has experimentally been confirmed that, when the optical length of the resonator is set to 300 mm or less, the number of reciprocating reflections within the resonator further increases, thus allowing a pulse having a peak value of 20 dB or higher in a wavelength band of 5 nm when the wavelength intervals are set to 5 nm to be oscillated, whereby eight wavelength regions of pulse light can be sent out. A wavelength-variable light source equipped with such a resonator can be used as a light source having an excellent crosstalk characteristic. While the optical length of the resonator is preferably as short as possible, its practical lower limit is determined by the minimum size required for forming the resonator.

A preferable second wavelength-variable light source in accordance with the present invention is characterized in that it comprises a semiconductor light-emitting device for emitting light having a plurality of predetermined wavelengths; a first light waveguide optically coupled to the semiconductor light-emitting device; a plurality of second light waveguides in which light-waveguide-type diffraction gratings having different reflection wavelengths are formed; a first optical switch for selectively optically coupling an output end of the first light waveguide to an input end of a plurality of the second light waveguides; and a second optical switch for selectively optically coupling a plurality of output ends of a plurality of the second light waveguides to an input end of a light waveguide in a next stage.

In the wavelength-variable light source of this invention, in place of the condenser, the second optical switch selectively optically couples a plurality of output ends of a plurality of the second light waveguides to an input end of a light waveguide in the next stage. Since the second optical switch has basically the same configuration as that of the first switch, it becomes inexpensive and easy to handle.

In the wavelength-variable light source of the present invention, when the first light waveguide and the next-stage light waveguide are made stationary while the second light waveguides are attached to a common movable mechanism, the first and second switches can be simultaneously switched upon a single switching operation, whereby its handling becomes easier. On the other hand, when the second light waveguides are made stationary while the first light waveguide and the next-stage light waveguide are attached to a common movable mechanism, the number of light waveguides on the moving side can be reduced, whereby the switching operation can be performed smoothly.

Preferably, in the wavelength-variable light source of the present invention, on the output side of the light-waveguide-type diffraction grating provided for each of the second light waveguides, a band-pass filter which transmits therethrough light in a wavelength region narrower than the wavelength region reflected by the light-waveguide-type diffraction grating is disposed; since, even when fluctuation in oscillation wavelength or the like occurs, the band-pass filter would act to correct the fluctuated wavelength to a predetermined wavelength region.

Also, the wavelength-variable light source in accordance with the present invention preferably comprises physical quantity changing means which changes a physical quantity of a light-waveguide-type diffraction grating such as temperature or tension, so as to vary the reflection wavelength of the light-waveguide-type diffraction grating.

Further, the above-mentioned wavelength-variable light source is preferably applied to an OTDR apparatus. The OTDR apparatus in accordance with the present invention is characterized in that it comprises the above-mentioned wavelength-variable light source, and a photodetector which feeds light outputted from the wavelength-variable light source into a system to be measured and detects backscattering light from the system to be measured. The light outputted from the light source is reflected at a predetermined position within the system to be measured, so as to return to the photodetector. The time required for light to effect this round travel is proportional to the distance to the predetermined position. Accordingly, as the photodetector detects the backscattering light intensity during the time of this round travel, information about a physical quantity at the predetermined position of the system to be measured such as defect, temperature, or the like, for example, can be observed.

Also, the OTDR apparatus in accordance with the present invention preferably comprises control means which controls, when an intensity of backscattering light from a position ahead of a specific position of the system to be measured detected by the photodetector becomes lower than a predetermined level, the physical quantity changing means so as to vary the reflection wavelength of the light-waveguide-type diffraction grating. When a branch device, for example, exists at a specific position, the backscattering light intensity decreases at this position. The backscattering light intensity from a position ahead of this specific position is lower than that from the position where the branch device exists. When the transmission wavelength characteristic of the branch device greatly deviates from its designed value depending on temperature, light is not sufficiently transmitted therethrough. Consequently, the backscattering light intensity from the position ahead of this position remarkably decreases, thereby becoming lower than a predetermined level. In such a case, the control means controls the physical quantity changing means so as to slightly change the wavelength of light outputted from the wavelength-variable light source such that this light is efficiently transmitted through the branch device. It is preferred that the control means regulate the physical quantity changing means such that the backscattering light intensity from a predetermined position within the system to be measured is maximized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, modes for carrying out the present invention will be explained in detail with reference to the accompanying drawings. In the explanation of the drawings, constituents identical to each other will be referred to with numerals identical to each other, without their overlapping descriptions being repeated.

Figure 1:
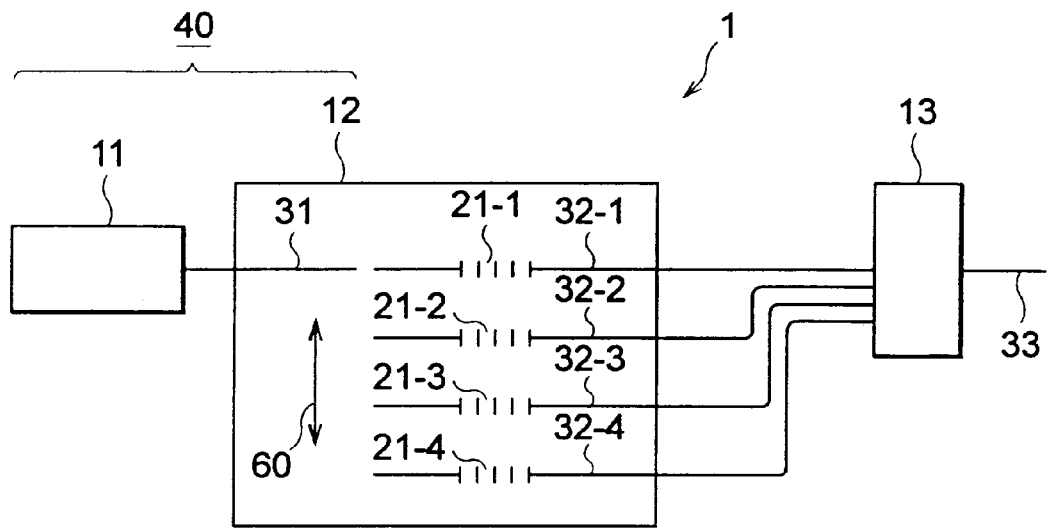
FIG. 1 is a view showing a configuration of a wavelength-variable light source in accordance with the present embodiment.
Figure 2:
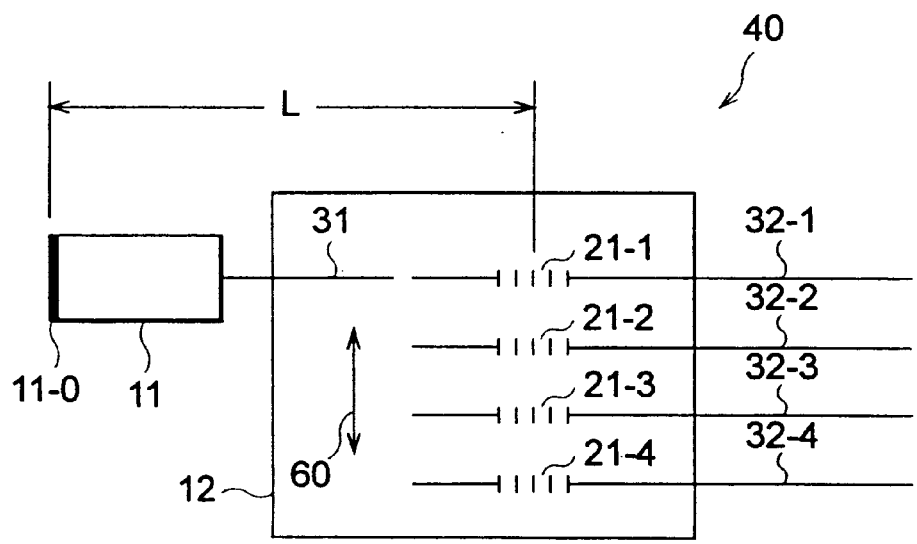
FIG. 2 is a view showing a configuration of a resonator in the wavelength-variable light source of the present embodiment.

FIG. 1 is a view showing a configuration of the first wavelength-variable light source in accordance with an embodiment, whereas FIG. 2 is a view showing, of the wavelength-variable light source, a part forming a resonator. In FIG. 1, a wavelength-variable light source 1 comprises a semiconductor light-emitting device 11; a first light waveguide 31 constituted by an optical fiber connected to the semiconductor light-emitting device 11; second light waveguides 32-1 to 32-4, disposed in parallel to each other at respective positions where they can oppose the first light waveguide 31, in which light-waveguide-type diffraction gratings 21-1 to 21-4 having reflection wavelengths different from each other are respectively formed; a first optical switch 12 formed such that the first light waveguide 31 can selectively connect with the second light waveguides 32-1 to 32-4 while relatively moving in directions of arrow 60 along input end faces thereof; and a condenser 13 which couples and emits output light beams having different wavelengths respectively sent out from the second light waveguides 32-1 to 32-4 to an input end of a light waveguide 33.

Further, as shown in FIGS. 1 and 2, the semiconductor light-emitting device 11, first light waveguide 31, second light waveguides 32-1 to 32-4, and light-waveguide-type diffraction gratings 21-1 to 21-4 form a resonator 40, in which light having a wavelength reflected by the light-waveguide-type diffraction gratings 21-1 to 21-4 is reflected to-and-fro between a reflecting plate 11-0 disposed on the rear side of the semiconductor light-emitting device 11 and the light-waveguide-type diffraction gratings 21-1 to 21-4 (optical length: L). The condenser 13 is formed in combination with a multiplexer, a photocoupler in which two optical fibers are distributed and connected together, thereby yielding a good wavelength-preserving characteristic. Though LDs are normally formed with the reflecting plate 11-0, some LEDs lack it. Preferably, the reflecting plate 11-0 has a reflectivity of at least 90%, whereas the surface opposite thereto has a reflectivity of 0.1% or lower.

In the wavelength-variable light source 1 shown in FIG. 1, light oscillated by the semiconductor light-emitting device 11 reaches the light-waveguide-type diffraction grating 21-1 by way of the first light waveguide 31 and the second light waveguide 32-1, whereby a wavelength $\lambda_1$ determined by the interval of the light-waveguide-type diffraction grating 21-1, whose core periodically changes its refractive index in the core axis direction, is reflected. Thus reflected light $\lambda_1$ is reflected again by the reflecting plate 11-0, and advances toward the light-waveguide-type diffraction grating 21-1 together with the light oscillated by the semiconductor light-emitting device 11. After reflections are subsequently repeated in a similar manner, light having a wavelength of $\lambda_1$ is sent to the condenser 13. Since the second light waveguides 32-1 to 32-4 respectively having a plurality of light-waveguide-type diffraction gratings 21-1 to 21-4 with reflection wavelength regions different from each other are disposed in parallel on the output side of the first optical switch 12; as they are switched by the first optical switch 12, light beams respectively having wavelengths $\lambda_1$ to $\lambda_4$ different from each other can be successively oscillated and sent out.

Figure 3A:
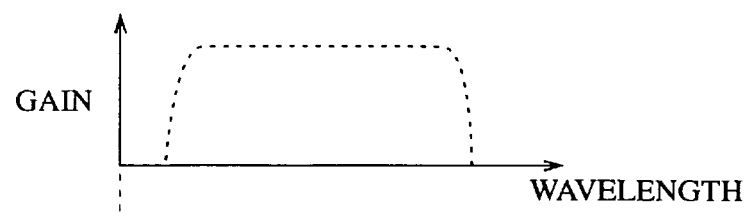
FIGS. 3A, 3B, 3C, 3D and 3E are views showing relationships between output wavelengths in the wavelength-variable light source shown in FIG. 1.
Figure 3B:
Figure 3C:
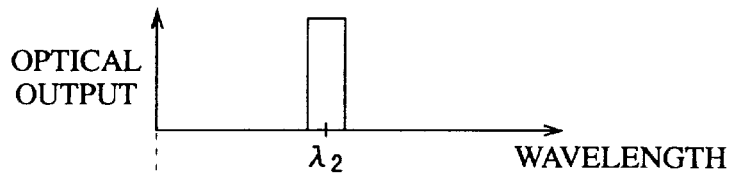
Figure 3D:
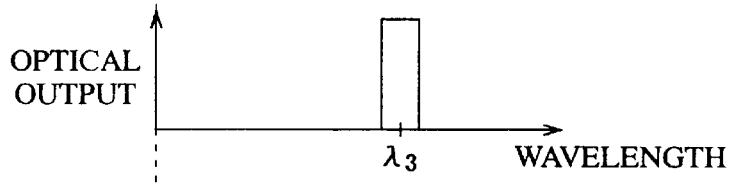
Figure 3E:
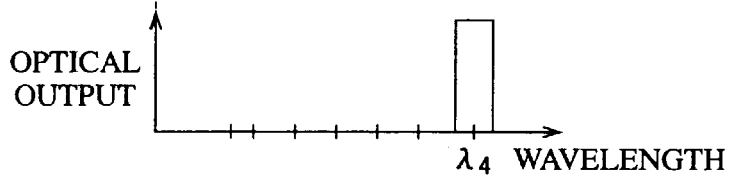

The greater the number of reflections repeated within the resonator 40, the more likely the wavelength band confined within a pulse waveform would coincide with the wavelength band characteristic of the diffraction grating 21. FIGS. 3A is a view showing a gain waveform of the semiconductor light-emitting device 11, and FIGS. 3B to 3E show optical outputs oscillated by the respective second light waveguides 32-1 to 32-4.

The light source of this embodiment is configured such that the light-waveguide-type diffraction gratings 21-1 to 21-4 are disposed in parallel, and while they are switched by the optical switch, a predetermined wavelength of light is oscillated, whereby a wavelength-variable light source having a simple configuration can be obtained inexpensively.

Also, the oscillation wavelength and its band are determined by the reflection wavelength of the light-waveguide-type diffraction grating and can be controlled by the optical length between the semiconductor light-emitting device and the light-waveguide-type diffraction grating, whereby the oscillation wavelength band can be minutely adjusted. Here, the fading noise noticeable upon measurement of a loss distribution of an optical fiber tends to occur when the wavelength band confined in the pulse light to be measured is 1 nm or less. To suppress the fading noise, it is preferred that the reflection wavelength band of the light-waveguide-type diffraction grating be set to 1 nm or more by chirp grating which imparts a variation to the grating interval.

Figure 4:
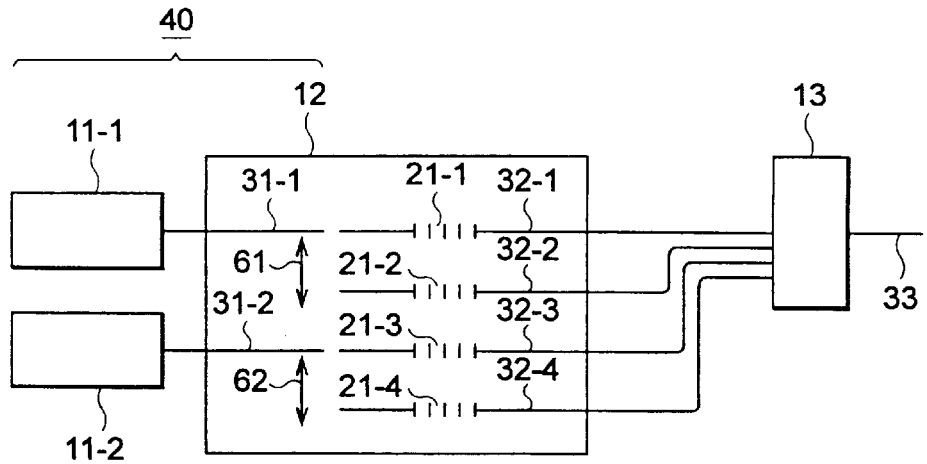
FIG. 4 is a view showing a configuration of the wavelength-variable light source in accordance with the present embodiment.
Figure 5A:
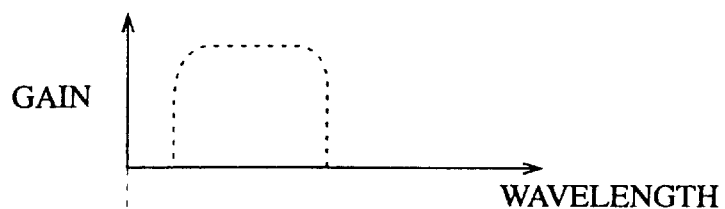
FIGS. 5A, 5B, 5C, 5D, 5E and 5F are views showing relationships between output wavelengths in the wavelength-variable light source shown in FIG. 4.
Figure 5B:
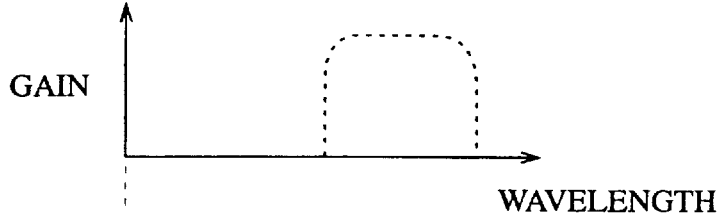
Figure 5C:
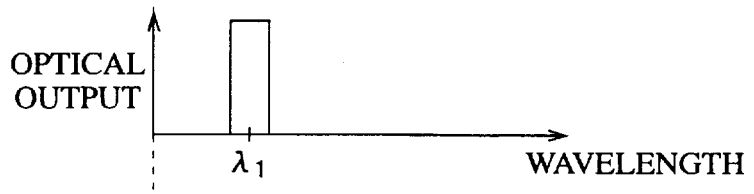
Figure 5D:
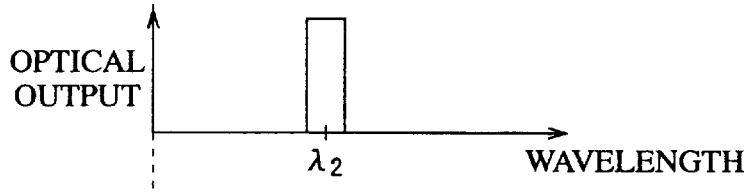
Figure 5E:
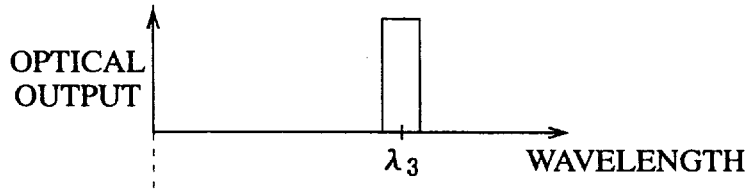
Figure 5F:
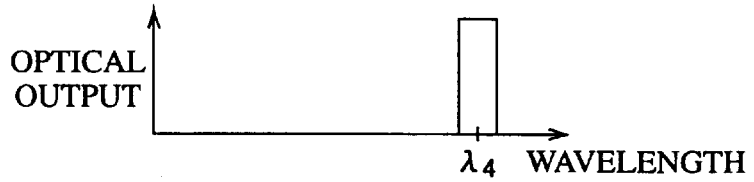

Next, there may occur a case where the number of light-branching lines is so large that a single semiconductor light-emitting device cannot oscillate the whole measurement wavelength band. In such a case, as shown in FIG. 4, a plurality of semiconductor light-emitting devices 11-1 and 11-2 having light-emitting wavelength bands different from each other are disposed in parallel so as to bear different parts of the wavelength region. FIGS. 5A and 5B are graphs showing respective gain waveforms of the two semiconductor light-emitting devices 11-1 and 11-2 having light-emitting wavelength bands different from each other, whereas FIGS. 5C to 5F are graphs showing output wavelengths respectively transmitted to the second light waveguides 32-1 to 32-4 in sequence.

Figure 6:
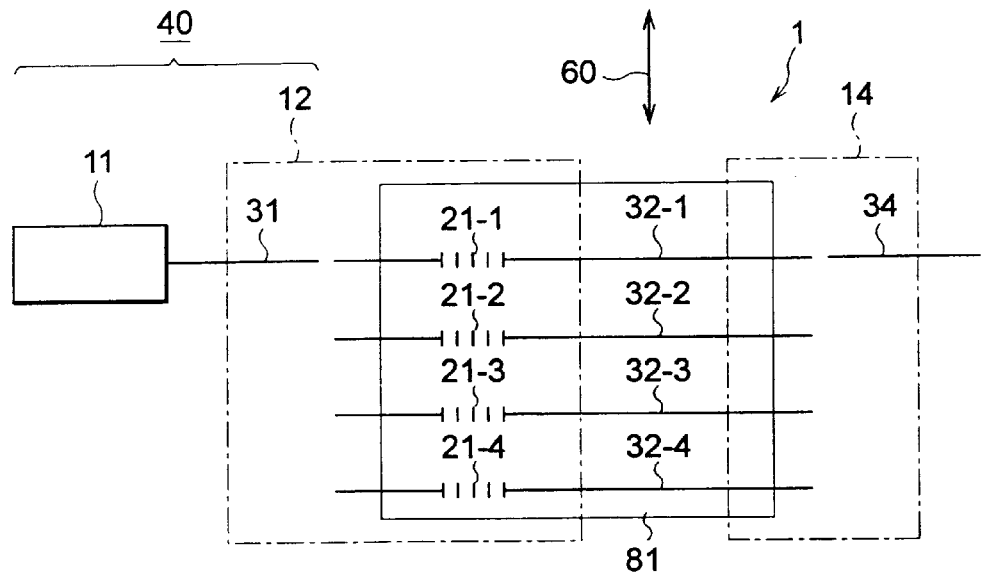
FIG. 6 is a view showing another configuration of the wavelength-variable light source in accordance with the present embodiment.

FIG. 6 is a view showing a configurational mode of a second wavelength-variable light source in accordance with this embodiment, in which the semiconductor light-emitting device 11 and first optical switch 12 are the same as those in FIG. 1. The condenser means shown in FIG. 6 is a second optical switch 14 in which a third light waveguide 34 is disposed at a position where it can oppose output ends of the second light waveguides 32-1 to 32-4, and the input end of the third light waveguide 34 can selectively connect with the second light waveguides 32-1 to 32-4 while relatively moving along the output end faces thereof in directions of arrow 60. Since this condenser means has a smaller number of parts and its basic configuration is identical to that of the first optical switch 12, it becomes inexpensive and easy to handle.

In thus configured light source, when the first and third light waveguides 31 and 34 are made stationary while the second light waveguides 32 are attached to a common movable mechanism 81, and the movable mechanism 81 is moved in directions of arrow 60; the first and second optical switches 12 and 14 can be switched simultaneously, and light beams having wavelengths $\lambda_1$ to $\lambda_4$ different from each other can be emitted from the third light waveguide 34. Not only the output waveform of the semiconductor light-emitting device 11 but also the output waveforms of the second light waveguides 32-1 to 32-4 and third light waveguide 34 are the same as those of FIGS. 3A to 3E.

Figure 7:
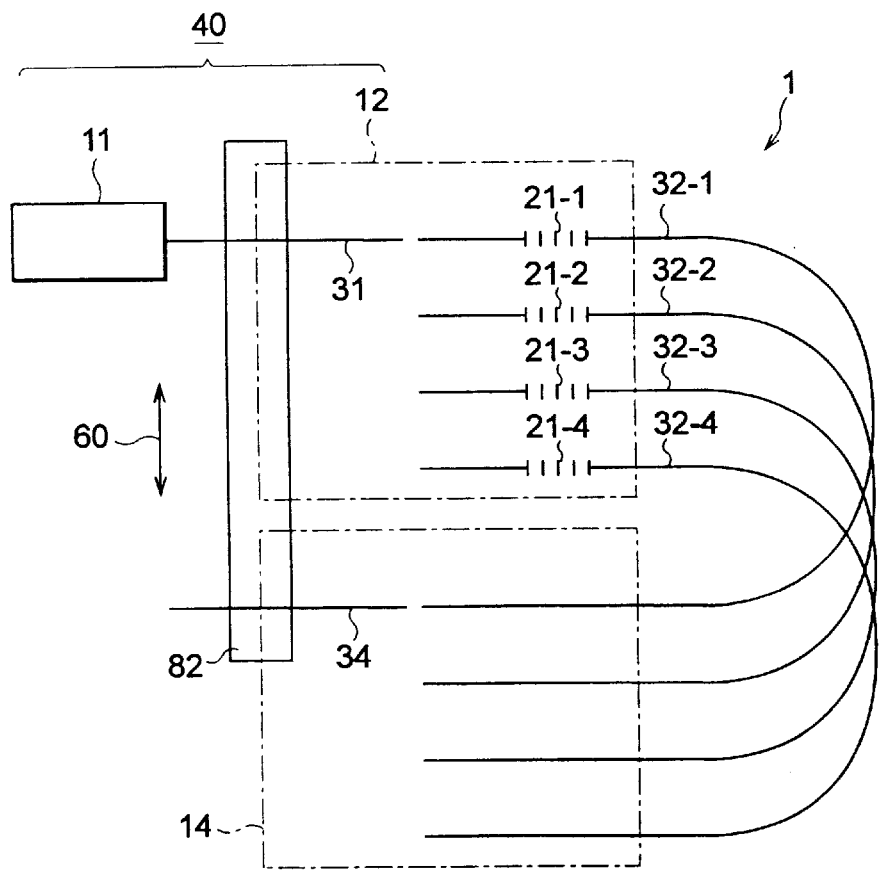
FIG. 7 is a view showing another configuration of the wavelength-variable light source in accordance with the present embodiment.

FIG. 7 is a view showing another configurational mode of the second wavelength-variable light source in accordance with this embodiment, in which the semiconductor light-emitting device 11 and first optical switch 12 are the same as those of FIG. 1. The condenser means shown in FIG. 7 is a second optical switch 14 in which the second light waveguides 32-1 to 32-4 are bent in the shape of the letter U so as to align their output ends with their input ends, the third light waveguide 34 is disposed at a position where it can oppose the output ends of the second light waveguides 32-1 to 32-4, and the input end of the third light waveguide 34 can selectively connect with the second light waveguides 32-1 to 32-4 while relatively moving along the output end faces thereof. As the condenser means 14 is formed as being bent in the shape of the U, this configuration is suitable for the case where the line to be measured is oriented in the same direction as its measuring apparatus. Not only the output waveform of the semiconductor light-emitting device 11 but also the output waveforms of the second light waveguides 32-1 to 32-4 and third light waveguide 34 are the same as that of FIG. 2.

Though the first and second optical switches 12 and 14 shown in FIGS. 6 and 7 relate to a case where they are switched while the light waveguide to be connected is mechanically moved, such switching can be effected at a high speed when a configuration in which they are electrically switched is employed.

Figure 8:
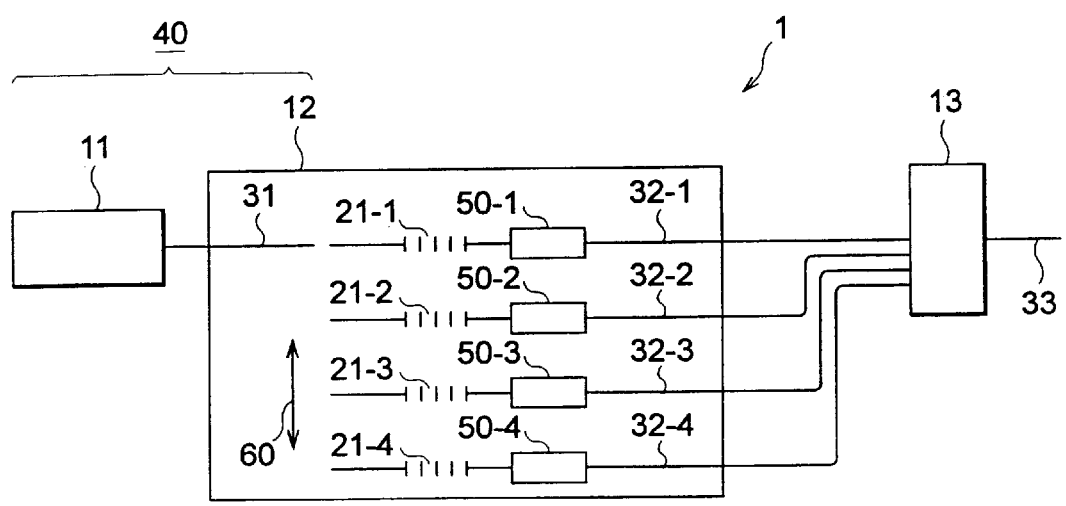
FIG. 8 is a view showing another configuration of the wavelength-variable light source in accordance with the present embodiment.
Figure 9A:
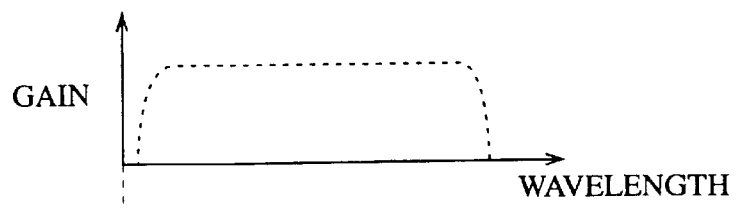
FIGS. 9A, 9B, 9C, 9D, 9E, 9F, 9G, 9H and 9I are views showing relationships between output wavelengths in the wavelength-variable light source shown in FIG. 8.
Figure 9B:
Figure 9C:
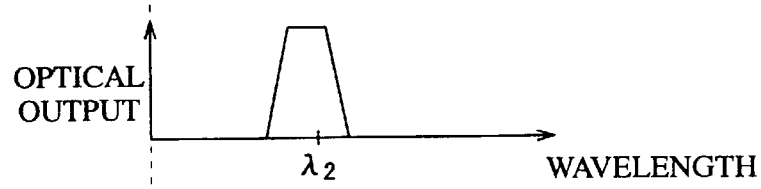
Figure 9D:
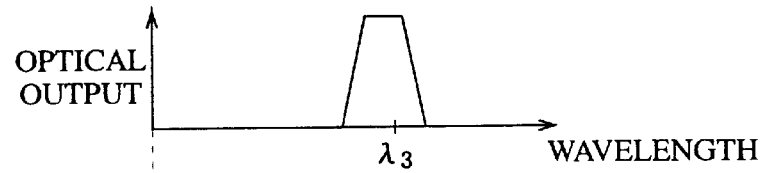
Figure 9E:
Figure 9F:
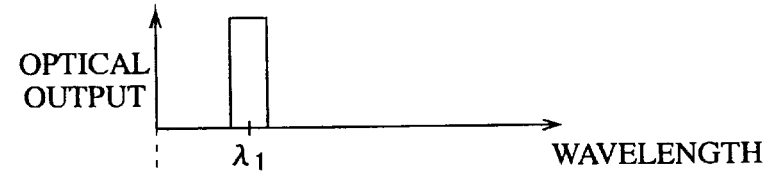
Figure 9G:
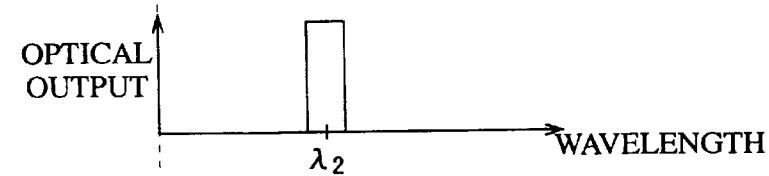
Figure 9H:
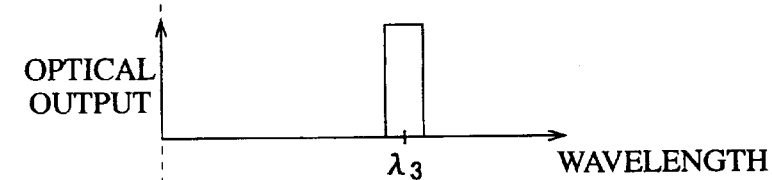
Figure 9I:

Though the wavelength-variable light source 1 in this embodiment can emit pulse light having a predetermined wavelength region by means of the light-waveguide-type diffraction gratings 21-1 to 21-4 and resonator 40, it is preferable that, as shown in FIG. 8, band-pass filters 50-1 to 50-4 respectively transmitting therethrough wavelength regions of light corresponding to the reflection wavelength regions of the discrete diffraction gratings be disposed on the output side of the light-waveguide-type diffraction gratings 21-1 to 21-4, since they act to correct fluctuation which may occur in oscillation wavelength or oscillation waveform. FIG. 9A shows oscillation waveform of the semiconductor light-emitting device 11, FIGS. 9B to 9E show output waveforms of the light-waveguide-type diffraction gratings 21-1 to 21-4 when their oscillation wavelength or oscillation waveform is fluctuated, and FIGS. 9F to 9I show their output waveforms after corrected by the band-pass filters 50-1 to 50-4. Namely, it is preferred in the wavelength-variable light source in accordance with this embodiment that, on the output side of the light-waveguide-type diffraction gratings 21-1 to 21-4 respectively formed in the second light waveguides, the band-pass filters 50-1 to 50-4 each transmitting therethrough light having a wavelength region narrower than the wavelength region reflected by its corresponding light-waveguide-type diffraction grating be disposed, since they act to correct, even when fluctuation of oscillation wavelength band occurs, such fluctuation to a predetermined wavelength region.

EXAMPLE 1

Figure 10A:
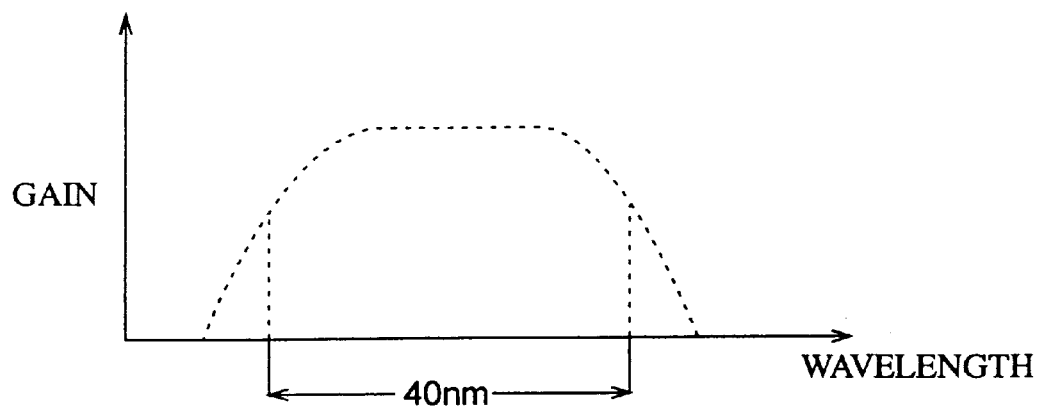
FIGS. 10A, 10B and 10C are views showing output waveforms of respective parts in the wavelength-variable light source in accordance with Examples.

Pulse light was oscillated by the wavelength-variable light source 1 having the configuration shown in FIG. 1. As shown in FIG. 10A, the semiconductor light-emitting device 11 employed as its light source has a gain wavelength width of 40 nm. As the light-wavelength-type diffraction grating 21, 10 kinds of diffraction gratings were formed by adjusting intervals of periodically-changing refractive index of their cores.

Figure 10B:
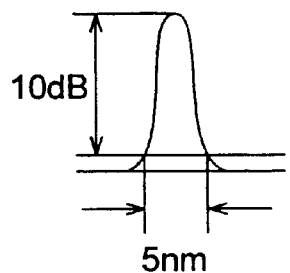

While the optical length L between each of the light-waveguide-type diffraction gratings 21-1 to 21-10 and the reflecting plate 11-0 of the semiconductor light-emitting device is set to 700 mm, the first optical switch 12 is switched, thus allowing pulse light beams $\lambda_1$ to $\lambda_{10}$ with wavelength regions different from each other to be respectively emitted from the second light waveguides 32-1 to 32-10. As a result $\lambda_2$ to $\lambda_9$ exhibited a pulse waveform having a peak value of 10 dB or higher in a wavelength band of 5 nm when the wavelength intervals are set to 5 nm as shown in FIG. 10B.

The light source of Example 1 is practically usable as a wavelength-variable light source, since it can measure as many as eight lines. It is not favorable for the optical length L to exceed 700 mm, since the wavelength band confined within a pulse was broadened, thereby reducing the number of usable pulse light beams.

EXAMPLE 2

Figure 10C:
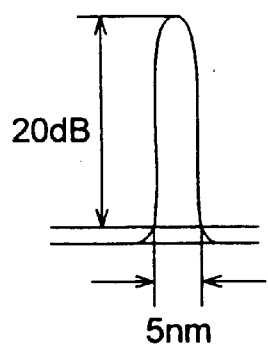

In the wavelength-variable light source 1 having the same configuration as that of Example 1, with the optical length L being set to 300 mm, the first optical switch 12 is switched, thus allowing pulse light beams $\lambda_1$ to $\lambda_{10}$ with wavelength regions different from each other to be respectively emitted from the second light waveguides 32-1 to 32-10. Consequently, as the number of reciprocating reflections increased, $\lambda_2$ to $\lambda_9$ exhibited a pulse waveform having a peak value of 20 dB or higher in a wavelength band of 5 nm when the wavelength intervals are set to 5 nm as shown in FIG. 10C.

The light source of Example 2 can effect measurement with a better crosstalk characteristic as compared with that of Example 1. Though the optical length of a resonator is thus preferably as short as possible, its practical lower limit is determined by the size minimally required for forming the resonator.

Each of the foregoing wavelength-variable light sources can be used as a light source for an OTDR apparatus. In the following, an optimal wavelength-variable light source and an OTDR apparatus using the same will be explained in detail.

Figure 11:
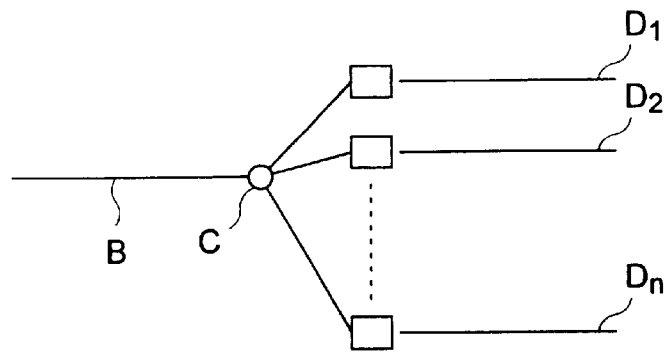
FIG. 11 is an explanatory view of a branch optical line.

Recently proposed as an optical subscriber system network structure is a branch optical line in which, as shown in FIG. 11, an optical line B is split into a plurality of optical fibers (light-branching lines) $D_1$ to $D_n$ at a branch point C thereof. A specific wavelength of light is fed into this network, and its returning component is measured so as to constantly monitor the state of the network.

Figure 12:
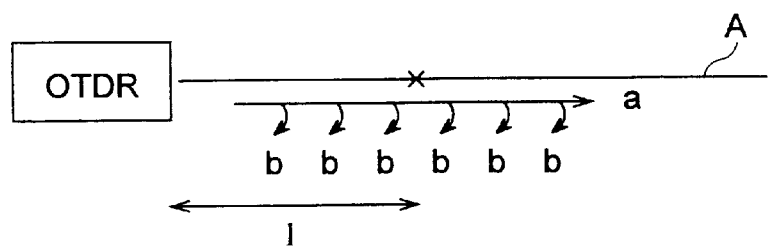
FIG. 12 is a view for explaining a system for measuring a loss distribution of an optical line.

Conventionally known as means for measuring a loss distribution of an optical fiber line in its longitudinal direction is OTDR (optical time domain reflectometer) method. In the OTDR method, light advancing through an optical fiber A shown in FIG. 12 (arrow a in FIG. 12) is scattered by a loss or the like in the optical fiber A, and its component (backscattering light) returning as shown in arrows b of FIG. 12 is measured as a function of traveling time. Since the intensity of backscattering light is in proportion to the optical power existing in the longitudinal direction of the optical fiber, and the traveling time is in proportion to the distance L to its position, a distribution of optical power in the longitudinal direction can be logarithmically expressed as shown in FIG. 13.

Figure 13:
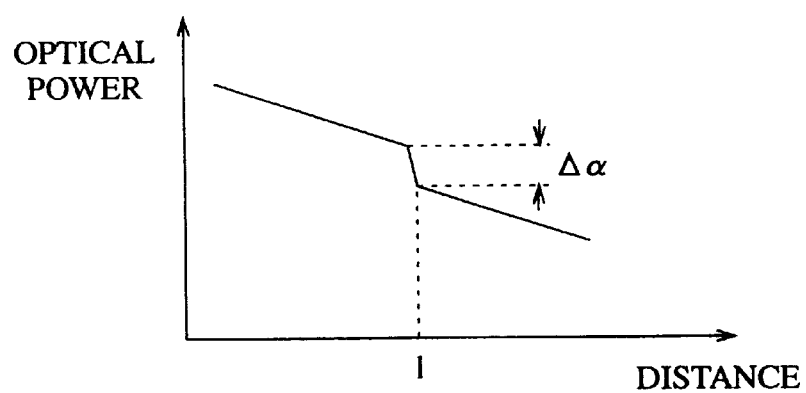
FIG. 13 is a view showing a relationship between the power measured by the measurement system of FIG. 12 and distance.

In FIG. 13, $\Delta\alpha$ (level difference in power) indicates a connection loss at the branch point. When the conventional OTDR method is applied to measurement of this branch optical line, backscattering light components from all the light-branching lines $D_1$ to $D_n$ are collectively received by the OTDR, whereby the light-branching lines $D_1$ to $D_n$ cannot be measured discretely.

Figure 14:
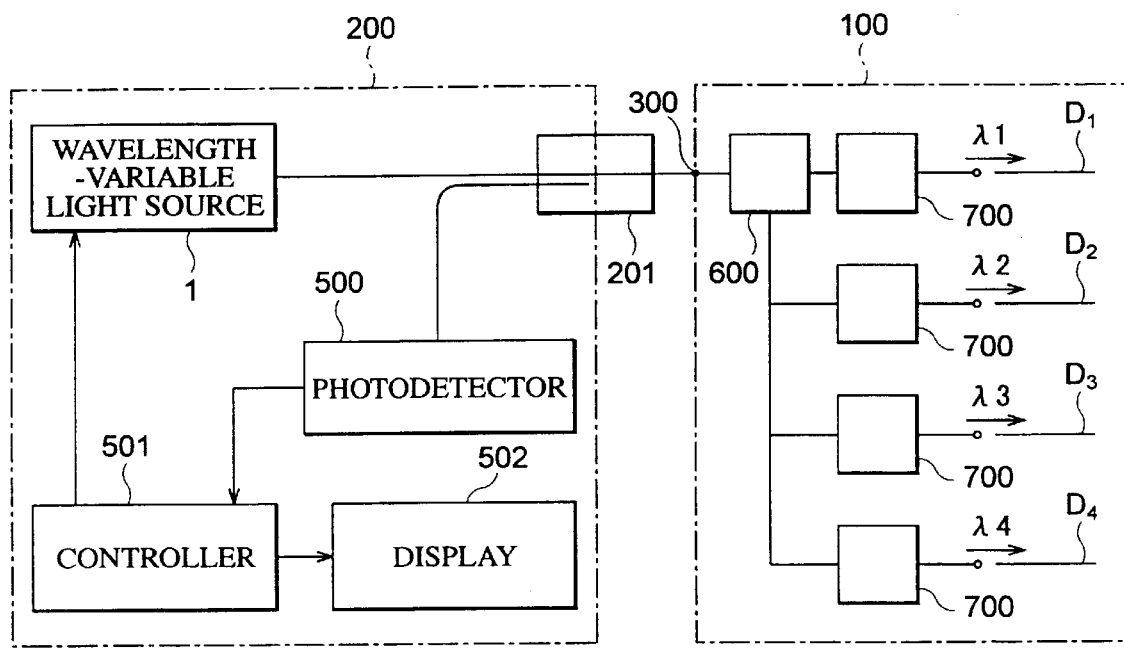
FIG. 14 is an overall view of a wavelength-variable light source and a system to which this light source is applied.

In order to measure individual lines, as shown in FIG. 14, of a branch optical line 100 split by a branch device 600 into a plurality of light-branching lines $D_1$ to $D_4$, an unbranched end 300 is connected to the wavelength-variable light source 1 in accordance with above-mentioned embodiment. A light-receiving section (photodetector) 500 of an OTDR apparatus 200 is connected, by way of a photocoupler 201 such as WDM to a system to be measured so that return light can be detected. Each of the light-branching lines $D_1$ to $D_4$ is provided with a band-pass filter 700 which can transmit therethrough one wavelength while blocking the other wavelengths.

Figure 15A:
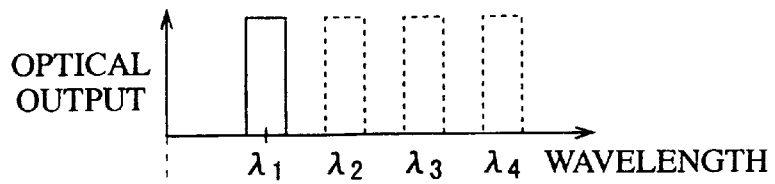
FIGS. 15A, 15B, 15C, 15D and 15E are views showing relationships between output wavelengths of the wavelength-variable light source shown in FIG. 14 and the wavelengths transmitted to the branch optical line.
Figure 15B:
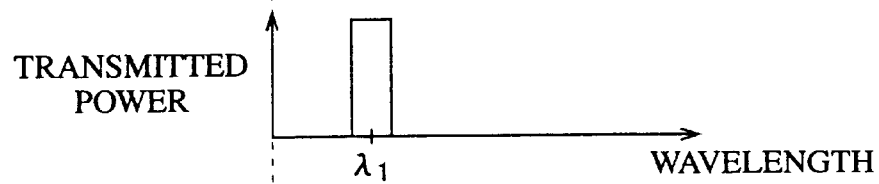
Figure 15C:
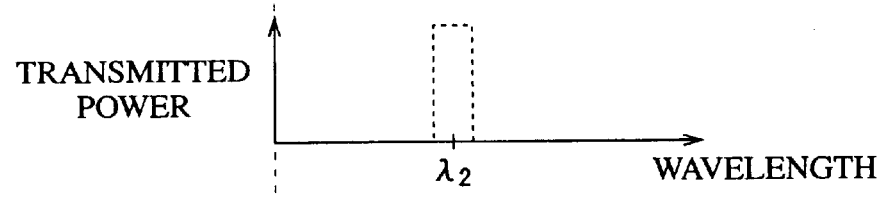
Figure 15D:
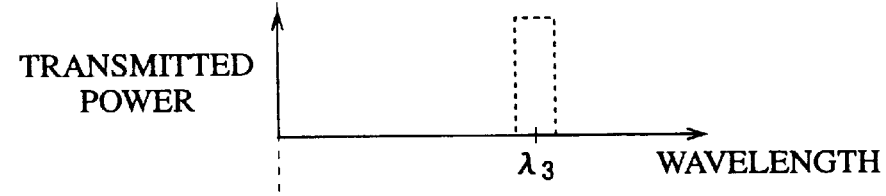
Figure 15E:

In this OTDR apparatus, when the wavelength-variable light source 1 successively oscillates light beams $\lambda_1$ to $\lambda_4$ having wavelengths different from each other as shown in FIG. 15A, the light beams $\lambda_1$ to $\lambda_4$ having wavelengths different from each other as shown in FIGS. 15B to 15E are respectively fed into the light-branching lines $D_1$ to $D_4$ through their corresponding band-pass filters 700. The scattering light components having wavelengths different from each other are detected, wavelength by wavelength, by the light-receiving and processing section (photodetector) 500 of the OTDR 200. As the wavelength of scattering light is made to correspond to the light-branching lines $D_1$ to $D_4$, the loss distribution in the longitudinal direction can be measured independently. The branch device 600 is a star coupler or the like. When combined with the band-pass filter 700, it attains a function similar to that of a WDM having a plurality of dielectric interference films and thereby yielding a transmission wavelength selectivity.

Namely, the wavelength-variable light source 1 emits different wavelengths $\lambda_1$ to $\lambda_4$ of light at different times. The light transmitted through the optical fiber 300 as a light waveguide is split in terms of power as it passes through the branch device 600, so as to be fed into the band-pass filters 700 having transmission wavelength bands different from each other. Accordingly, the different wavelengths $\lambda_1$ to $\lambda_4$ of light are respectively inputted into the individual optical fiber lines $D_1$ to $D_4$. From the system to be measured including the individual optical fiber lines $D_1$ to $D_4$ ahead of the light source 1, backscattering light components return toward the light source 1 in response to their positions. The backscattering light is detected by the photodetector 500 via the photocoupler 201 and then is fed into a controller 501. The controller 501 graphs the backscattering light intensity as a function of returning time, i.e., distance, and represents thus formed graph on a display 502.

Figure 16:
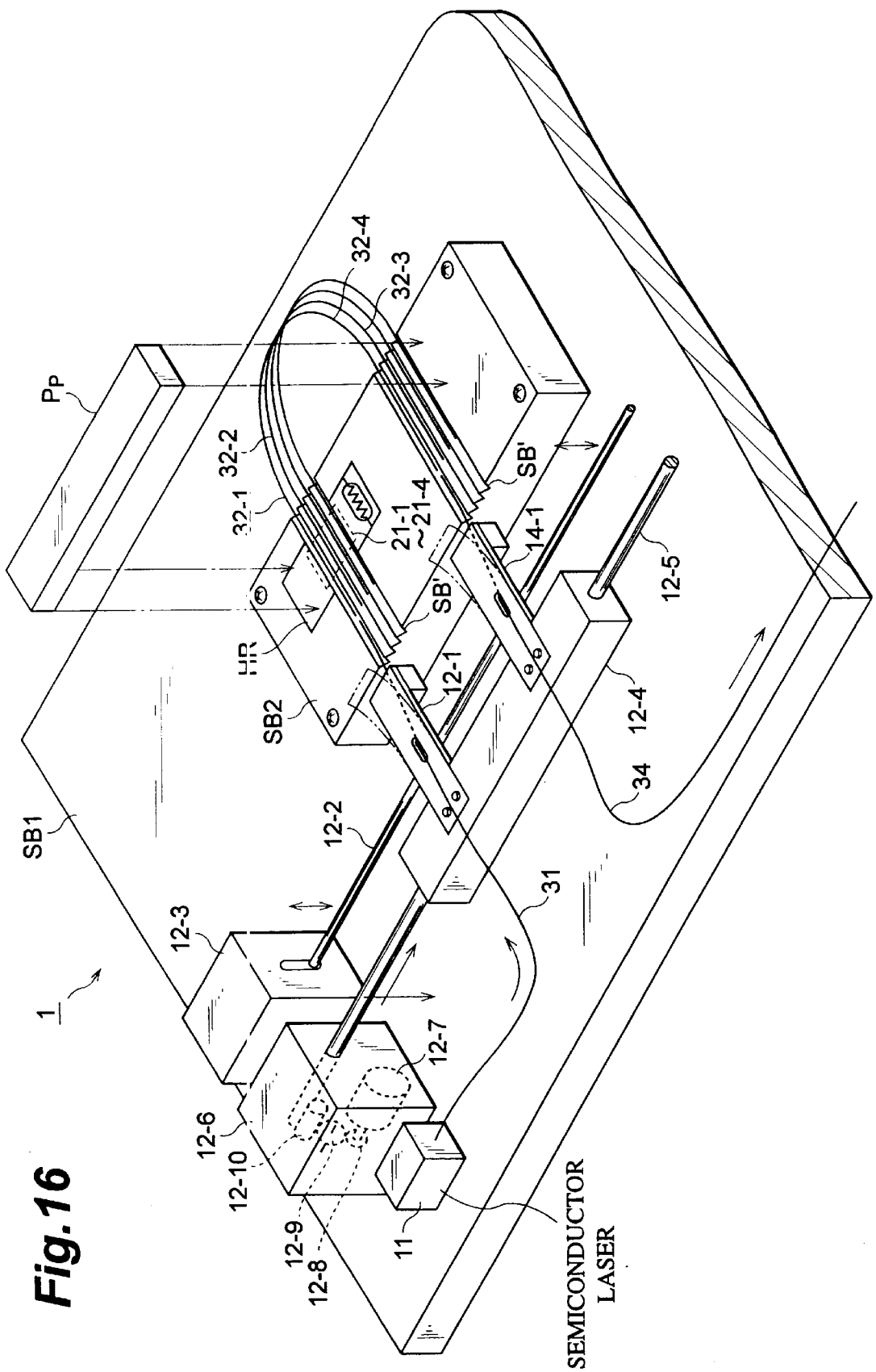
FIG. 16 is a perspective view of a wavelength-variable light source.

FIG. 16 is a perspective view showing an optimal example of the above-mentioned wavelength-variable light source 1. This wavelength-variable light source 1 corresponds to a detailed view of that shown in FIG. 7. Onto a base substrate SB1, a mounting table SB2 is secured. Optical fibers 32-1 to 32-4 are respectively disposed within V-shaped grooves SB' formed on the surface of the mounting table SB2 and are pressed against the mounting table SB2 by a pressure plate Pp. Disposed below diffraction gratings 21-1 to 21-4 of the respective optical fibers is a heater HR as a physical quantity changing means. When the diffraction gratings 21-1 to 21-4 are heated by the heater HR, their temperature changes, thereby varying reflection wavelength. Optical fibers 31 and 34 obliquely pass through openings of cantilever-shaped elastic members 12-1 and 14-1, each of which has one end secured onto a supporting member 12-4, respectively, whereby their tip portions are pressed into their corresponding V-shaped grooves SB' due to elastic forces of the elastic members 12-1 and 14-1. A lift bar 12-2 is disposed between the elastic members 12-1 and 14-1 and the base substrate SB1. When the lift bar 12-1 is moved up by vertical moving mechanisms 12-3 (one of which is not depicted) respectively supporting both end portions of the lift bar 12-2, the elastic members 12-1 and 14-1 flex upward, whereby both the optical fibers 31 and 34 leave the V-shaped grooves SB'.

Here, when a supporting rod 12-5 secured to the supporting member 12-4 is moved in a direction orthogonal to the longitudinal direction of the V-shaped grooves SB' by means of a horizontal moving mechanism 12-6, the fibers 31 and 34 are moved. After they are moved as desired, the lift bar 12-2 is moved down so that the fibers 31 and 34 are placed within different V-shaped grooves SB', thus terminating switching. Here, though the horizontal moving mechanism 12-6 may be configured in various manners, a rotary driving force of a stepping motor 12-7 is transmitted to a worm gear 12-10 via gears 12-8 and 12-9, and this rotary movement is transformed by the worm gear 12-10 into a horizontal movement by which the supporting rod 12-5 is moved horizontally. An end portion of the supporting rod 12-5 is formed with tooth flanks, which are in mesh with the worm gear 12-10.

When this wavelength-variable light source is applied to the OTDR apparatus 200 shown in FIG. 14, the controller 501 regulates the moving mechanisms 12-3 and 12-6 upon switching as mentioned above. Further, the controller (control means) 501 regulates the heater HR so as to vary the reflection wavelengths of the light-waveguide-type diffraction gratings 21-1 to 21-4. Namely, since the branch devices 600 and 700 have temperature characteristics, there may be cases where their transmission wavelength varies depending on temperature, whereby backscattering light from a point ahead of these devices cannot fully be detected. Therefore, in the OTDR apparatus in accordance with this embodiment, in the case where the backscattering light intensity from a position within the system to be measured by the photodetector 500 ahead of a specific position, i.e., ahead of the position where the branch devices 600 and 700 are located, becomes lower than a predetermined level, the heater HR as the physical quantity changing means is controlled so as to change the reflection wavelengths of the light-waveguide-type diffraction gratings 21-1 to 21-4.

Figure 17:
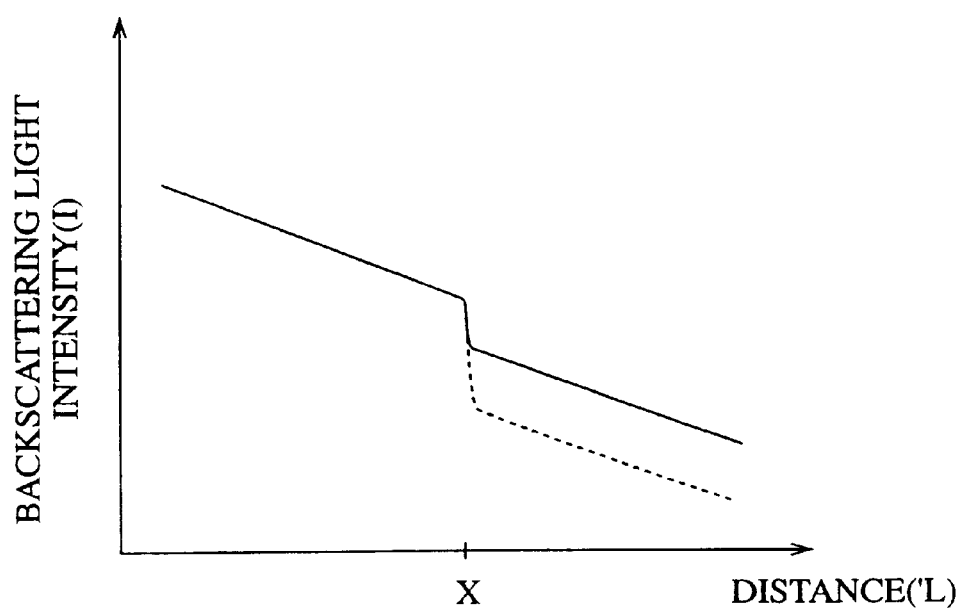
FIG. 17 is a graph showing a dependency of backscattering light intensity (I) on distance (L).

In other words, as shown in FIG. 17, for example, when the branch devices 600 and 700 are at a specific position X, the backscattering light intensity decreases at this position X. The intensity of backscattering light from a position ahead of this position X is lower than that at the position X where the branch devices 600 and 700 are. When the transmission wavelength characteristics of the branch devices 600 and 700 greatly deviate from their designed values depending on temperature, light fails to be fully transmitted therethrough, whereby the backscattering light intensity from a position ahead of this position X becomes lower than a predetermined level (as indicated by dotted line in the drawing). In such a case, the controller 501 regulates the physical quantity changing means HR so as to slightly change the wavelength of light outputted from the wavelength-variable light source 1, such that thus outputted light is efficiently transmitted through the branch devices 600 and 700. Namely, the controller 501 controls the physical quantity changing means HR so that the backscattering light intensity from the predetermined position X within the system to be measured is maximized. Alternatively, pressure-applying means such as piezoelectric device may be employed as the physical quantity changing means HR.

When the intensity of backscattering light from a position ahead of the position X remarkably decreases so that it becomes lower than a predetermined level, the controller controls the physical quantity changing means HR so as to vary the reflection wavelength of the diffraction grating. In the case where the backscattering light intensity from the predetermined position X does not increase even when the reflection wavelength is thus varied, the controller 501 judges that there is abnormality in the branch devices 600 and 700, and causes the display 502 to indicate this state.

As stated above, in the wavelength-variable light sources according to the above embodiments, light-waveguide-type diffraction gratings are disposed in parallel and, are switched by an optical switch or the like, whereby it can vary the predetermined wavelength although the configuration is simple and inexpensive. Further, the wavelength-variable light sources according to the above embodiments are useful as a light source for a WDM communication. Further, in the wavelength-variable light sources according to the above embodiments, variation of temperature at a specific point in a system can be measured by monitoring backscattering light from the specific point while controlling the reflection wavelength of its diffraction grating, therefore, feedback of light different from observation light such as communication light can be achieved.

The present invention is configured such that light-waveguide-type diffraction gratings are disposed in parallel and, while they are switched by an optical switch or the like, a predetermined wavelength of light is oscillated, whereby a wavelength-variable light source having a simple configuration can be obtained inexpensively.

Also, since the oscillation wavelength and its band is determined by the reflection wavelength of a light-waveguide-type diffraction grating and can be controlled by the optical length between the semiconductor light-emitting device and the light-waveguide-type diffraction grating, the oscillation wavelength band can be minutely adjusted.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength-variable light source comprising:
    a semiconductor light-emitting device;
    a first light waveguide optically coupled to said semiconductor light-emitting device;
    a plurality of second light waveguides each having a diffraction grating associated therewith, each diffraction grating having a different reflection wavelength; and
    a first optical switch which selectively optically couples an output end of said first light waveguide to an input end of a selected one of said second light waveguides.

2. A wavelength-variable light source according to claim 1, further comprising:
    a condenser which optically couples a plurality of output ends of said second light waveguides to an input end of a light waveguide in a next stage.

3. A wavelength-variable light source according to claim 1, further comprising:
    a second optical switch which selectively optically couples an output end of said selected second light waveguide to an input end of a light waveguide in a next stage.

4. A wavelength-variable light source according to claim 1, wherein a path from said semiconductor light-emitting device to said diffraction grating of said selected second light waveguide constitutes a resonator which oscillates light having a wavelength which is reflected by said selected diffraction grating, said resonator having an optical length not greater than 700 mm.

5. A wavelength-variable light source according to claim 4,
    wherein said resonator has an optical length not greater than 300 mm.

6. A wavelength-variable light source according to claim 2, wherein said condenser comprises a multiplexer or a photocoupler.

7. A wavelength-variable light source according to claim 1, wherein said semiconductor light-emitting device comprises a plurality of semiconductor light-emitting devices having different wavelength regions and said plurality of semiconductor light-emitting devices are disposed in parallel.

8. A wavelength-variable light source according to claim 1, wherein, on the output side of said diffraction grating provided for each of said second light waveguides, a band-pass filter which transmits therethrough light in a wavelength range narrower than the wavelength range reflected by said diffraction grating is disposed.

9. A wavelength-variable light source according to claim 1, further comprising
    physical quantity changing means which changes a physical quantity of said diffraction grating so as to vary the reflection wavelength of said diffraction grating.

10. An OTDR apparatus comprising:
    a wavelength-variable light source according to claim 1; and
    a photodetector which feeds light outputted from said wavelength-variable light source into a system to be measured and detects backscattering light from said system to be measured.

11. An OTDR apparatus comprising:
    said wavelength-variable light source according to claim 9;
    a photodetector which feeds light outputted from said wavelength-variable light source into a system to be measured and detects backscattering light from said system to be measured; and
    control means which controls, when an intensity of backscattering light from a position ahead of a specific position of said system to be measured detected by said photodetector becomes lower than a predetermined level, said physical quantity changing means so as to vary the reflection wavelength of said diffraction grating.

12. An OTDR apparatus according to claim 11, wherein said control means controls said physical quantity changing means such that an intensity of backscattering light from a predetermined position within said system to be measured is maximized.

13. A wavelength variable light source, comprising:
    a semiconductor light-emitting device;
    a first light waveguide optically coupled to said semiconductor light-emitting device;
    a plurality of second light waveguides each having a diffraction grating associated therewith, each diffraction grating having a different reflection wavelength;
    a first optical switch which selectively optically couples an output end of said first light waveguide to an input end of a selected one of said second light waveguides;

a second optical switch which selectively optically couples an output end of said selected second light waveguide to an input end of a light waveguide in a next stage, wherein said first light waveguides are made stationary, and wherein said second first light waveguides and said next-stage light waveguides are attached to a common movable mechanism.

14. A wavelength variable light source, comprising:

a semiconductor light-emitting device;

a first light waveguide optically coupled to said semiconductor light-emitting device;

a plurality of second light waveguides each having a diffraction grating associated therewith, each diffraction grating having a different reflection wavelength;

a first optical switch which selectively optically couples an output end of said first light waveguide to an input end of a selected one of said second light waveguides;

a second optical switch which selectively optically couples an output end of said selected second light waveguide to an input end of a light waveguide in a next stage, wherein said second light waveguides are made stationary, and wherein said first light waveguides and said next-stage light waveguides are attached to a common movable mechanism.

* * * * *